United States Patent

[11] 3,617,248

| [72] | Inventor | Elmer F. Litzinger<br>Louisville, Ky. |
|---|---|---|
| [21] | Appl. No. | 808,659 |
| [22] | Filed | Mar. 19, 1969 |
| [45] | Patented | Nov. 2, 1971 |
| [73] | Assignee | Allied Chemical Corporation<br>New York, N.Y. |

[54] SELECTIVE WEED CONTROL WITH HERBICIDAL DIPHENYL-N-(CHLOROPHENOXY-ACETYL)-THIAZONE IMINES
2 Claims, No Drawings

[52] U.S. Cl. .................................................. 71/90, 260/306.7, 260/465 E
[51] Int. Cl. ................................................... A01n 9/12
[50] Field of Search ............................................ 71/90, 118; 260/306.7, 306.8

[56] References Cited
UNITED STATES PATENTS

| 2,577,969 | 12/1951 | Jones ........................... | 71/118 |
| 2,879,273 | 5/1959 | Asinger et al. ................. | 71/90 |
| 3,020,143 | 2/1962 | Bluestone ...................... | 71/90 |
| 3,374,082 | 3/1968 | Lemin ........................... | 71/90 |
| 3,439,018 | 4/1969 | Brookes et al. ................ | 71/118 |

FOREIGN PATENTS

| 1,862 | 2/1966 | Japan ........................... | 260/306.7 |
| 7,584 | 4/1966 | Japan ........................... | 260/306.7 |
| 624,118 | 2/1963 | Belgium ........................ | 71/118 |

*Primary Examiner*—Lewis Gotts
*Assistant Examiner*—G. Hollrah
*Attorneys*—Patrick L. Henry and Fred L. Kelly ABSTRACT: 2,3-Diphenyl-N-(chlorophenoxyacetyl)-thiazone imines are prepared by reacting S-cyanomethylisothiobenzanilide with a di- or tri-chlorophenoxyacetyl chloride, preferably in an inert solvent, to form the hydrochlorides of these N-acyl derivatives. Neutralization of the hydrochlorides gives the free bases. The compounds are useful as herbicides.

SELECTIVE WEED CONTROL WITH HERBICIDAL DIPHENYL-N-(CHLOROPHENOXY-ACETYL)-THIAZONE IMINES

BACKGROUND OF THE INVENTION

This invention relates to novel chlorophenoxyacetylthiazone imines; in particular, it relates to 2,3-diphenyl-N-(chlorophenoxyacetyl)-thiazone imines, their preparation and use as herbicides.

The need to control undesirable plant growth for efficient cultivation of crops has given rise to the development of a great variety of herbicidal agents. However, many of the chemical herbicides available heretofore do not have adequate potency or selectivity to afford optimum results. An effective herbicide must be highly effective against undesirable plants while remaining harmless with respect to the plant being cultivated, such as corn and wheat.

SUMMARY OF THE INVENTION

The novel compounds of the instant invention are di- and trichlorophenoxyacetylthiazone imines of the formula:

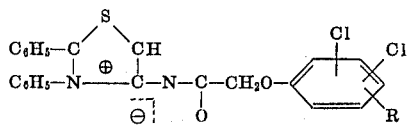

wherein R is hydrogen or chlorine. These compounds are prepared by reacting S-cyanomethylisothiobenzanilide with a di- or trichlorophenoxyacetyl chloride to form the hydrochlorides of the corresponding di- and trichlorophenoxyacetylthiazone imines, which are then neutralized to give the free bases. The novel compounds are useful as herbicides.

The sydnonelike, mesoionic structure of the novel compounds is a resonance hybrid which exists in several ionic states and has large dipole moments.

DETAILED DESCRIPTION OF THE INVENTION

Preparation of the instant compounds is unexpectedly accomplished by reacting S-cyanomethylisothiobenzanilide with an appropriate phenoxyacetyl chloride, preferably in an inert solvent, to form the hydrochloride according to the following sequence:

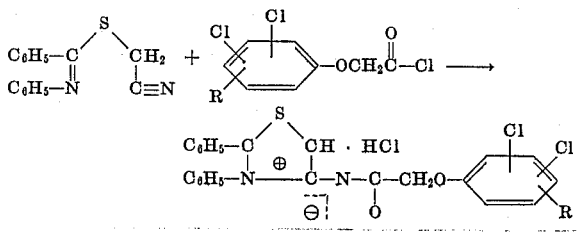

Neutralization of the hydrochlorides gives the corresponding free bases. Approximately equimolar amounts of the two substrates is normally used, although an excess of either might be used to achieve a higher yield with respect to the other.

The reaction can be conducted without use of an inert solvent although it is more convenient to use solvent. Without solvent, the reaction is conducted above the melting point of S-cyanomethylisothiobenzanilide, i.e., above about 69° C., and the phenoxyacetyl chloride is added to the molten S-cyanomethylisothiobenzanilide. Preferably, the reaction will be conducted at a temperature within the range of about 69° to 150° C., and more preferably 90° to 100° C. Reaction times as short as about 1 hour or less have been found to be adequate, although longer reaction times may be used if desired. Atmospheric pressure is normally used for the reaction, although subatmospheric or superatmospheric conditions might be employed.

The reaction is preferably conducted in an inert solvent such as benzene and toluene. Considerations regarding reaction temperature, time and pressure specified hereinbefore are appropriate for this purpose, although somewhat lower temperatures might be used if desired.

It has been found that it is preferable that the reaction be conducted in the absence of base in order to obtain the desired hydrochloride of the product, i.e., at a pH less than about 7.0. Presence of a base or acid acceptor in the reaction medium results in a competing reaction product. Preferably, solvent is separated from the product hydrochloride, and the hydrochloride is neutralized with an alkali, such as sodium bicarbonate in aqueous solution, to form the free base.

Substrate materials are readily available by procedures taught in the prior art. For example, S-cyanomethylisothiobenzanilide might be prepared by the following procedure: About 3.6 parts (by weight) of triethylamine is added to a solution of 5 parts thiobenzanilide and 1.8 parts chloroacetonitrile in about 22 parts of benzene, and the mixture is heated at 50° C. for 9 hours. The mixture is then allowed to stand overnight and the separated triethylamine hydrochloride is filtered off. The filtrate is evaporated to dryness under reduced pressure, and the residual crystals are collected. Recrystallization from ether-petroleum ether gives 3 parts of S-cyanomethylisothiobenzanilide as colorless needles having melting point of 68° to 69° C.

The instant compounds have been found to be unexpectedly effective herbicides in that they are very harmful to plants normally considered undesirable, such as rape and broadleafed weeds, while being harmless toward such plants as corn and wheat. 2,3-Diphenyl-N-(2,4-dichlorophenoxyacetyl)-thiazone imine is the preferred compound for this purpose.

Normally, the instant compounds will be used as the active ingredient in an herbicidal composition, although they might also be used without a carrier. Various diluents and carriers may be employed and the percent of active ingredient may be varied. Although compositions with less than about 0.5 percent by weight of active ingredient may be used, it is preferable to use compositions containing at least about 1.0 percent of active ingredient because otherwise the amount of carrier becomes excessively large. Activity increases with the concentration of active ingredient, which may be 10, 50, 95 percent or even higher.

The amount of composition which is applied for effective herbicidal action is dependent upon considerations such as the type of undesirable plant to be killed, the density of undesirable plants, and soil and climatic conditions. Usually, sufficient composition will be applied to provide about 8 to 16 pounds of active ingredient per acre.

The instant herbicidal compositions may be in the form of a solution, with the solvent being selected from acetone, benzene, and the like. These solutions can be applied to the plants in a direct manner such as by spraying, sprinkling, drenching, etc. Water suspensions can also be applied in this manner, with dispersing and emulsifying agents such as sodium alkyl sulfates and sulfonates and the like.

Application can also be achieved by dusting a powder in which the active ingredient is dispersed. Suitable carriers include finely powdered material such as clays, fullers earth, talc, etc.

The instant compounds may constitute the sole active ingredient in the herbicidal compositions, but they might be effectively used in combination with other active ingredients, such as other herbicides, insecticides and other plant-treating agents.

The following examples are provided to more fully illustrate the instant invention.

EXAMPLE I 2,3-Diphenyl-N-(2,4-Dichlorophenoxyacetyl)-Thiazone Imine

About 6 grams of 2,4-dichlorophenoxyacetyl chloride and 6.31 grams of S-cyanomethylisothiobenzanilide were placed in a flask containing 44 grams of dry benzene. The flask was attached to a condenser connected to a drying tube, and the reaction mixture was heated to about 80° C. on a steam bath. Within 2 minutes, solids began forming in the mixture. The reaction mixture was heated at about 80° C. for 1 hour then cooled to about room temperature. The solids were separated from the reaction mixture and washed with diethyl ether. The solids were then dissolved in water and the solution was mixed with a saturated solution of NaHCO$_3$. The desired product precipitated from the solution and was separated by filtration. Yield: 9.3 grams; melting point 184° to 185° C. Structure was confirmed by infrared analysis.

EXAMPLE II

The procedure of example I is repeated wherein an equivalent amount of appropriate phenoxyacetyl chloride is used to afford the following products:

2,3-diphenyl-N-(2,5-dichlorophenoxyacetyl)-thiazone imine
2,3-diphenyl-N-(2,6-dichlorophenoxyacetyl)-thiazone imine
2,3-diphenyl-N-(3,5-dichlorophenoxyacetyl)-thiazone imine
2,3-diphenyl-N-(2,4,5-trichlorophenoxyacetyl)-thiazone imine
2,3-diphenyl-N-(2,4,6-trichlorophenoxyacetyl)-thiazone imine
2,3-diphenyl-N-(3,4,5-trichlorophenoxyacetyl)-thiazone imine

EXAMPLE III

Herbicidal Activity

The following crop species and weed species were planted in metal flats (12×8.5×4 inches) in greenhouse plotting soil containing one-third mixed clay and sand, one-third mushroom soil, and one-third peat moss. The pH of the soil was 6.8 to 7.2.

Crop Species
  Corn, *Zea mays*, Hybrid U.S. 13
  Wheat, *Triticum vulgare*, variety Thorne
  Soybean, *Soja wax*, variety Wilson
Weed Species
  Ryegrass
  Rape Each flat received a volume of spray equal to 80 gallons per acre of an acetone solution of 2,3-diphenyl-N-(2,4-dichlorophenoxyacetyl)-thiazone imine. The concentration of the solution was adjusted to provide application of 8 pounds of active ingredient per acre. Immediately after spraying, the test flats were placed in aluminum trays and were irrigated until the surface of the soil in the flat was uniformly moist (at field capacity). Additional subirrigation was provided as needed to maintain moisture. No surface irrigation was applied.

The flats were sprayed within 1 day after seeding in preemergence tests, and 8 to 10 days after seeding in the postemergence tests. Results were observed 14 days after spraying.

The effect of the herbicide was evaluated in terms of the injury rating index scale, ranging from 0 to 10 as follows:
  0—No apparent injury
  1,2,3—Slight injury
  4, 5, 6—Moderate injury
  7, 8, 9—Severe injury (plants will die)
  10—Plants were dead An injury rating of 3 is the maximum tolerated for crops and a rating of 7 is minimum acceptable on weed plants.

| Plant | Injury Rating | |
|---|---|---|
|  | Preemergence | Postemergence |
| Corn | 1 | 1 |
| Wheat | 2 | 0 |
| Soybean | 9 | 9 |
| Ryegrass | 2 | 2 |
| Rape | 9 | 9 |

The aforementioned examples are provided for illustrative purposes only and are not to be construed as limiting the scope of the instant invention, which is defined by the appended claims.

I claim:
1. A method of inhibiting growth of undesirable vegetation in corn and wheat crops which comprises treating the vegetation with a compound of the formula:

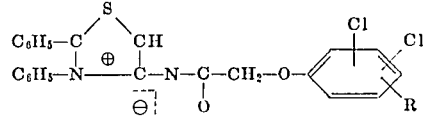

wherein R is hydrogen or chlorine, in an amount sufficient to inhibit the growth of the vegetation.
2. The method of claim 1 wherein said compound is 2,3-diphenyl-N-(2,4-dichlorophenoxyacetyl)-thiazone imine.

* * * * *